(12) United States Patent
Jack et al.

(10) Patent No.: US 7,807,051 B2
(45) Date of Patent: Oct. 5, 2010

(54) FLOATING OIL SKIMMER AND GRAVITATIONAL SEPARATION SYSTEM

(76) Inventors: Peter Douglas Jack, c/o 122-7198 Vantage Way, Delta, British Columbia (CA) V4G 1K7; Nels Robert Ladouceur, 122-7198 Vantage Way, Delta, British Columbia (CA) V4G 1K7

( * ) Notice: Subject to any disclaimer, the term of this patent is extended or adjusted under 35 U.S.C. 154(b) by 0 days.

(21) Appl. No.: 12/012,600

(22) Filed: Feb. 5, 2008

(65) Prior Publication Data

US 2009/0194472 A1 Aug. 6, 2009

(51) Int. Cl.
*C02F 1/40* (2006.01)

(52) U.S. Cl. ............ 210/122; 210/242.3; 210/255; 210/519; 210/540; 210/923

(58) Field of Classification Search .......... 210/104, 210/122, 242.3, 255, 258, 261, 262, 519, 210/538, 540, 923
See application file for complete search history.

(56) References Cited

U.S. PATENT DOCUMENTS

| | | | | |
|---|---|---|---|---|
| 1,450,545 A | * | 4/1923 | Hans ................. | 210/122 |
| 4,132,645 A | * | 1/1979 | Bottomley et al. | 210/540 |
| 4,271,017 A | * | 6/1981 | Milgram ............ | 210/519 |
| 4,422,931 A | * | 12/1983 | Wolde-Michael | 210/519 |
| 4,818,399 A | * | 4/1989 | Midkiff ............. | 210/242.3 |
| 5,030,342 A | * | 7/1991 | Ortega .............. | 210/242.3 |
| 5,154,835 A | * | 10/1992 | DeMichael ....... | 210/242.3 |
| 5,505,860 A | * | 4/1996 | Sager ................ | 210/519 |
| 5,693,218 A | * | 12/1997 | Yamamoto et al. | 210/540 |
| 5,713,697 A | * | 2/1998 | Steiner ............. | 210/242.3 |
| 6,322,694 B1 | * | 11/2001 | Iliadis et al. ..... | 210/242.3 |
| 6,458,282 B1 | * | 10/2002 | Lundback ......... | 210/923 |
| 6,743,358 B1 | * | 6/2004 | Lundback ......... | 210/242.3 |

* cited by examiner

*Primary Examiner*—Christopher Upton

(57) ABSTRACT

A floating oil skimmer and gravitational separator system, consisting of a vessel adapted to be submerged in a body of water. Oil/water are drawn through the floating skimmer head by a water pump, pumping water through the skimmer head as water is pumped out of the vessel from the bottom of the vessel. The improved skimmer head design improves control of the skimmer head buoyancy and stability, thereby more consistently bringing oil/water into the vessel. An improved means of coalescence and collection of oil into the top of the inside of the vessel is also disclosed, where the oil once collected is then pumped out of the vessel for storage and the water is returned to the water body. Methods of manufacturing the system are also disclosed.

11 Claims, 10 Drawing Sheets

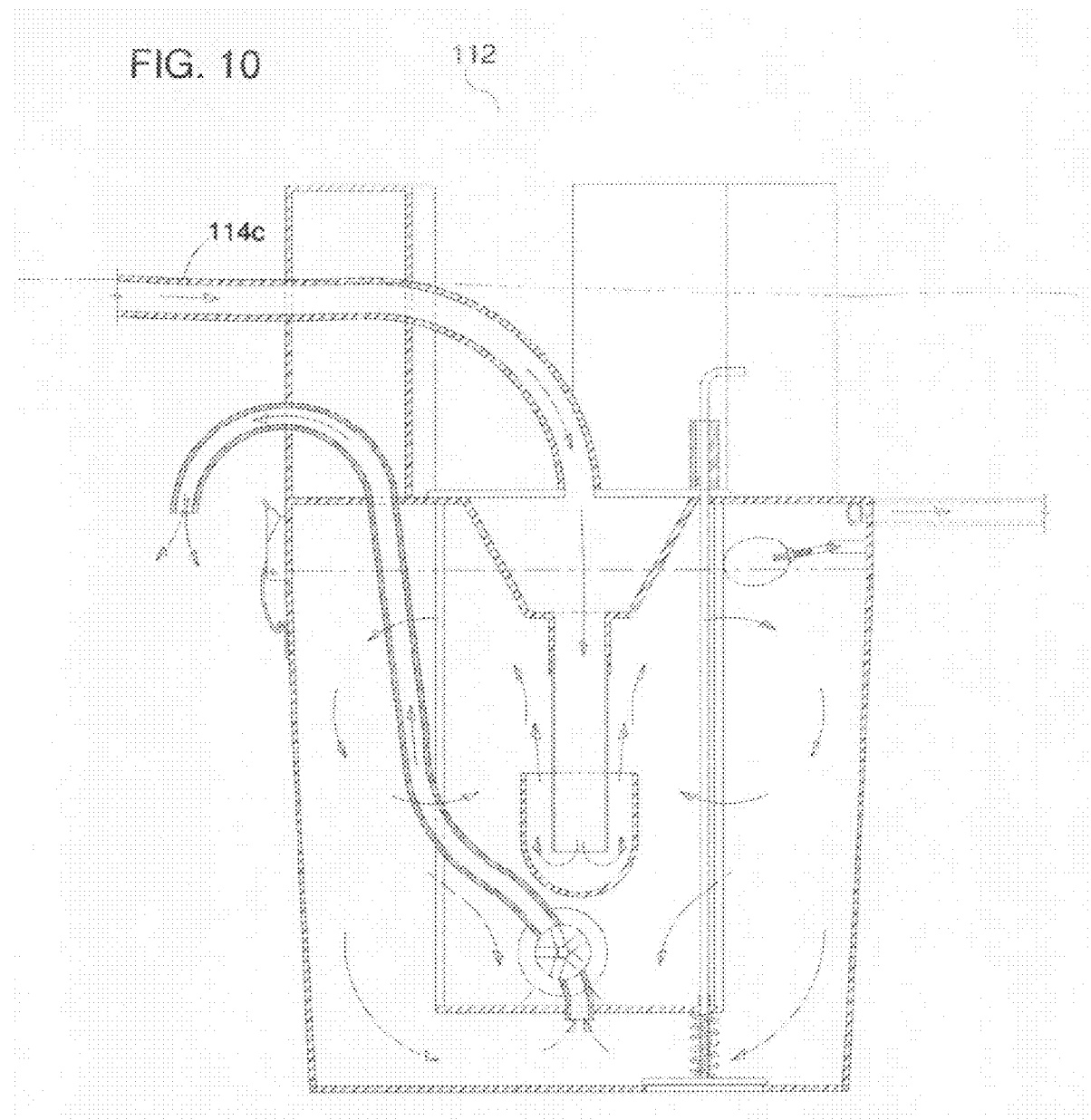

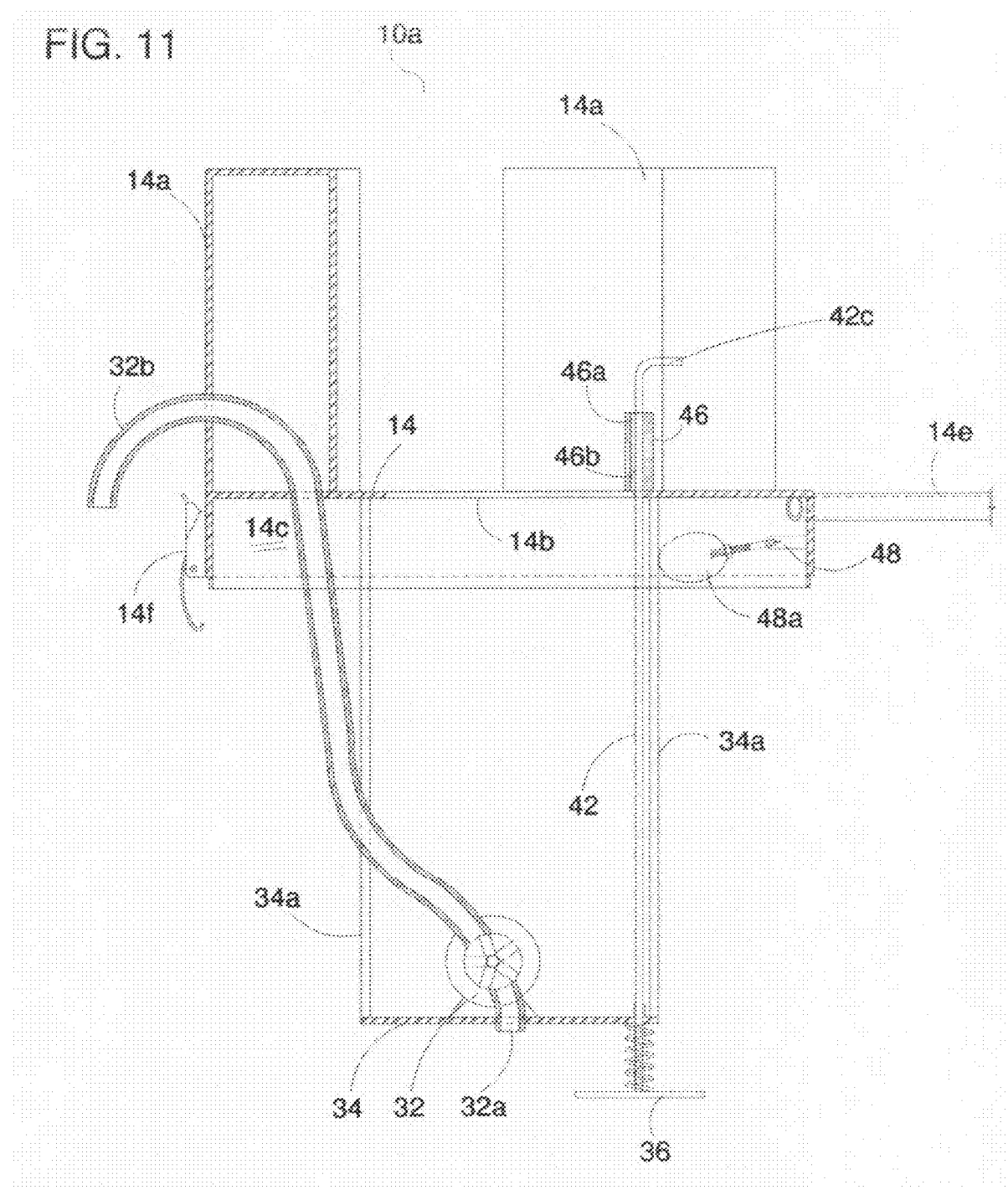

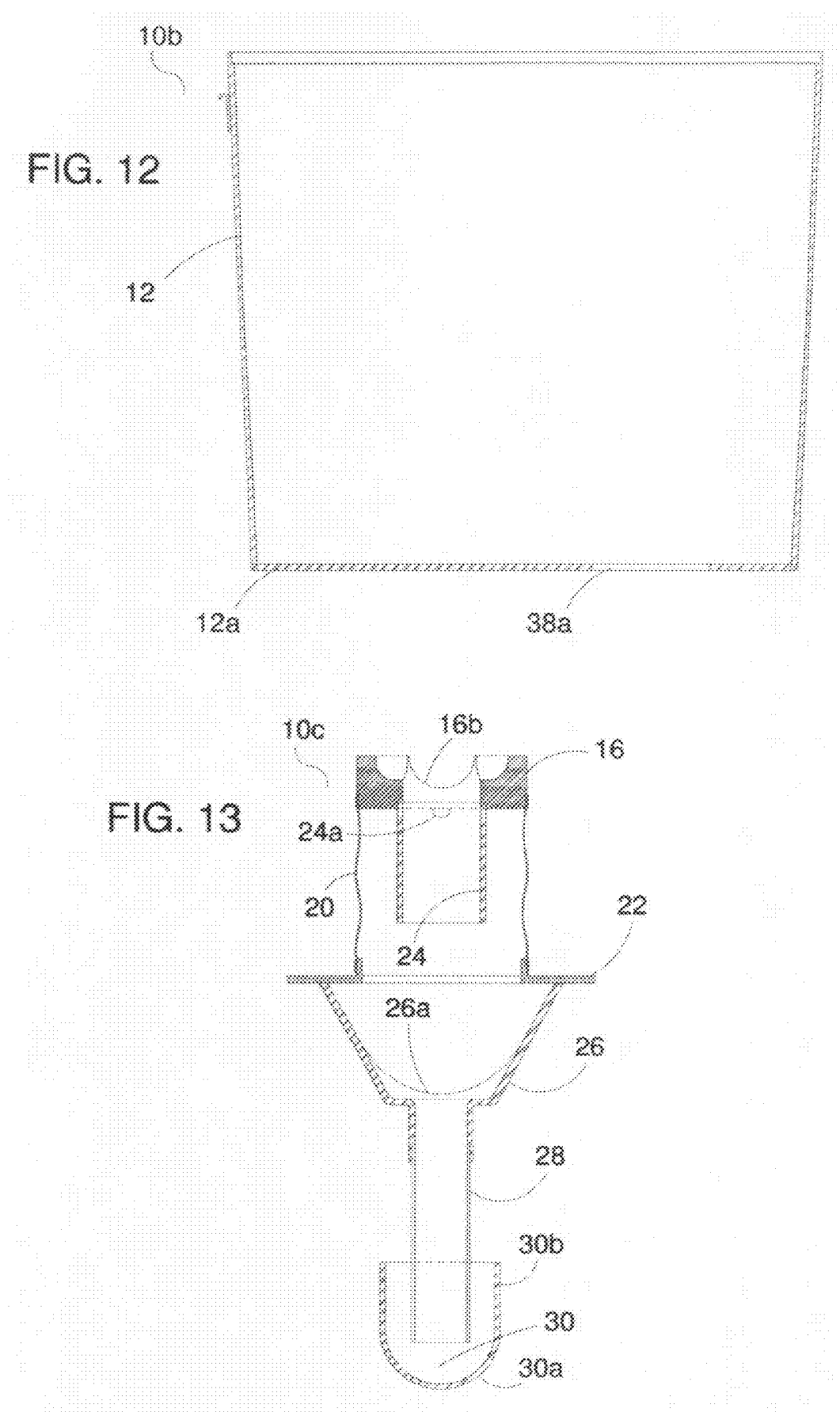

FLOATING OIL SKIMMER AND GRAVITATIONAL SEPARATION SYSTEM

TECHNICAL FIELD

The invention relates to a system for collecting oil or petroleum-based products from the surface of a body of water by means of a floating skimmer and a gravitational separator vessel, and more specifically to a system for removal of petroleum-based products in the lighter spectrum—as well as vegetable-based oils, utilizing a self leveling and stabilized floating skimmer head and an optimized gravitational separator. The gravitational separator may be directly or remotely attached to the floating skimmer head.

BACKGROUND OF THE INVENTION

The elimination of petroleum-based products or oil from polluting marine and inland waters, which is a serious environmental problem and is perhaps of a greater relevance than ever before due to the degree of drilling, production and transportation at this time. Several approaches have been used in attempting to solve this problem. In the chemical approach, suitable substances are utilized which are capable of either absorbing the oil or of combining with them in such a manner that the oil can subsequently precipitate out or be dissolved in the waters. In the mechanical approach, one of the methods that have been used involves the provision of suitable floating weirs through which the oil, mixed with water, are drawn by means of pumps. This mixture is conveyed into barges or the like wherein separation of the oil from the water takes place by decantation.

Other methods of oil separation from water have been utilized such as simple oleophilic rope skimmers and absorbent pads, to more sophisticated onshore separation systems. Generally such methods create problems with disposal and/or returning recovered water to its source without further treatment or processing.

Absorbent pads used in light oil spill cleanup need to be disposed of in an environmentally friendly way. Typically absorbent pads have been incinerated under usually controlled conditions. However, some degree of air pollution will always result from incineration. Pumps used for skimming, along with delivery of oily water will always contribute to emulsification of the oil and water as a result of shearing of the normally insoluble liquids. To ensure that separated water being returned to source meets effluent specifications, filtration is often required to remove trace amounts of oil. Water returned to a stream, lake or ocean must meet or exceed the requirements of local, municipal and national discharge laws.

These methods have certain disadvantages. The chemical methods are very costly and do not allow the oil based products to be reclaimed. The decantation methods, on the other hand, require large barges or the like for the collection of the mixture of oil based products and water, furthermore the oil based products become emulsified with the water while being drawn through a pump, which increases the difficulty of subsequent separation.

Oil recovery from the surface of a body of water using floating surface skimmers and floating separators, with the separators either directly attached to the skimmer or remotely attached have been described using many different techniques. Efficient and economical methods for light oil and fuel spill cleanup have always been problematic.

As mentioned there have been a number of systems employed to separate oil or petroleum-based products from water. Inventor is aware of the following patents:

U.S. Pat. No. 39,169 issued to Israel Peck et al. on Jul. 7, 1863 entitled Skimmer.

U.S. Pat. No. 569,016 issued to O. A. Darrow Oct. 6, 1896 entitled Oil Separator.

U.S. Pat. No. 2,624,463 issued to E. F. Freese Jun. 10, 1949 entitled Liquid-Separating Device.

U.S. Pat. No. 2,876,903 issued to Harry W. Lee May 26, 1954 entitled Oil Skimmer and Separator Vessel.

U.S. Pat. No. 3,428,178 issued to Floyd M. Nash Aug. 30, 1967 entitled Skimmer Assembly and Weir Assembly.

U.S. Pat. No. 3,853,768 issued to Bagnulo Dec. 10, 1974 entitled Skimming Apparatus.

U.S. Pat. No. 5,840,198 issued to Clarke Nov. 24, 1998 entitled Separation apparatus and method.

U.S. Pat. No. 6,015,501 issued to Lundback Jan. 18, 2000 entitled Method and apparatus for skimming a floatable surface layer from a water surface.

U.S. Pat. No. 6,458,282 issued to Lundback Oct. 1, 2002 entitled Method and apparatus for separating floating pollutants.

U.S. Pat. No. 6,743,358 issued to Lundback Jun. 1, 2004 entitled Apparatus for collecting material floating on a body of water.

Accordingly it is an object of the present invention to provide an improved system for skimming and separating surface-floating petroleum-based products and oil from a body of water, achieve in a single operation.

A further object of the invention is to overcome certain disadvantages of prior art.

Another object of the invention is to provide an apparatus whereby surface-floating oil may be economically recovered.

Yet another object of the invention is to provide an apparatus that can be manufactured in modules to improve shipping, storage and assembly in the field.

Still another object of the invention is to provide an apparatus that can be quickly and easily placed in a body of water without the need for a team with heavy equipment.

The floating oil skimmer and gravitational separator system of the present invention has other objects and features of advantage which will become apparent from and are set forth in more detail in, the accompanying drawings and following details.

DISCLOSURE OF THE INVENTION

The floating oil skimmer and gravitational separator system of the present invention is designed for the removal of light petroleum-based or vegetable type oil pollutants, more generally referred to as "oil", from the surface of marine and inland waters.

The apparatus includes a round floating skimming head that has added top end buoyancy along with additional lower end mass to improve stability. A downward protruding flow tube has been added to the bottom surface of the skimmer head, around the skimmer head inlet, where the flow tube accounts for the lower weight. A flexible sleeve is attached to the outside diameter of the skimmer head, where the flexible sleeve holds the skimmer head in position while allowing the skimmer-head to move vertically in an unencumbered manner as required depending on the flow as demanded. There are vent holes at the top of the flow tube, just below the lower surface of the skimmer head, expelling any air or oil build-up below the skimmer head and between the sleeve and the flow tube.

In the first embodiment of the invention the skimmer head sleeve is attached to a floating gravitational separator vessel. The floating gravitational separator vessel is a round tank or bucket, preferably with tapered sides, with a top and a bottom, where the top includes a sizeable inlet hole for connection of the skimmer head sleeve. Preferably the vessel top is removably attached to the vessel.

The bottom of the vessel, or near the bottom, includes a water pump, where the water pump may be mounted on a water outlet or water pick-up tube. If a remote pump is used, only the pick-up tube is required. This pump pick-up tube would for simplicity of construction, be attached to the vessel top and exited through the vessel top.

Attached and evenly spaced around the vessel top are three floatation members, where the floatation members have adequate space between the floatation members to allow access of the surface oil/water to flow unimpeded towards the skimmer head.

Included at the vessel inlet and within a circumference larger than the inlet is a round disk, where the skimmer head sleeve is directly attached. The round disk also attaches a debris catcher below the disk and centered around a central hole through the disk. The debris catcher includes a screen on the bottom to prevent debris from entering the separator vessel. Attached just below the debris catcher is a descending tube, where the descending tube is held within the central circumference of the debris catcher and thus the central circumference of the vessel.

Attached to the lower end of the descending tube, at about a central depth within the vessel is a cup shaped deflector/coalescer. The deflector/coalescer has an optimized surface shape, where its lower surface is hemispherical, with a vertical surface arising directly from the hemispherical lower surface. This surface area is set away from the descending tube at a distance equal to the inside diameter of the descending tube, allowing a similar flow volume as that of the descending tube. The hemispherical and vertical surface of the deflector/coalescer allows for a smooth laminar upward flow. This smooth laminar upward flow causes the oil droplets to coalesce and collect on the vertical surface, further causing the droplets to coalesce into larger oil droplets as they rise.

The oil droplets rise up through the water and collect under the vessel top and just outside of the debris catcher and descending tube. Once enough oil collects here the oil can be pumped out to a collection tank that is remote from the separator vessel. The preferred embodiment further includes an oil pump, where the oil pump is activated, once a certain level of oil is collected, by a floating switch just below the surface of the vessel top. The oil pump has an outlet hole near the top area of the separator vessel. The oil pump may be mounted inside of the vessel, or can be remote positioned outside the vessel, such as on an oil tank mounted on a ship, barge, dock, or on land.

The preferred embodiment of the invention includes, near the bottom and located centrally in the vessel, a mounting plate, where the mounting plate is suspended by rods directed downwards from the bottom of the vessel top. The mounting plate mounts both the water pump, or if a remote water pump is used, the pump suction tube and a spring loaded filling and emptying valve.

The pump suction tube or pump inlet is located centrally in the plate and the opening is directed underneath the plate. The filling and emptying valve is located to contact the bottom of the separator vessel, where there is an opening. The valve has a rod that is directed up through the plate and up through the vessel top, where the rod has a lever attached above the vessel top, to operate the opening and closing of the valve. This valve allows the vessel to be quickly filled with water as the vessel is lowered into the water to begin the function of skimming and collecting oil from the surface of the water body it is placed in. As well, the valve is opened to quickly drain the water from the vessel, after the function is completed.

The first embodiment of the invention also includes an air vent tube mounted through the vessel top, where the air vent top is above the skimmer head and substantially above said water body. The air vent tube allows any air bubbles trapped in the vessel to escape, thus keeping the vessel buoyancy optimized.

A first alternate embodiment of the preferred inventions the separator vessel includes a downward sloping coalescence/deflector near the lower mid section of the vessel. This coalescence/deflector assists the water to circulate upwards before being drawn down by the water pump inlet at the bottom area of the vessel, as well as creating more coalescence surfaces for stray oil droplets to build. This downward sloping coalescence/deflector includes a row of holes around the periphery to allow any stray oil droplets that may collect on the back surface, to rise up to the vessel top.

A second alternate embodiment of the preferred invention includes a reversible-water pump, where the same pump that draws water/oil into the skimmer and thus the separator vessel through the pick-up tube, can be reversed, once the collected oil reaches a certain level, to forced the collected oil out through a hose or tube, towards an oil collection tank, which may be on a boat or ashore. This alternate embodiment requires that there be a one-way valve within the descending tube, which blocks the descending tube as the water pump is reversed. Once the oil level is diminished to a specified level, the floating pump switch again reverses the water pump to restart the skimmer and oil collection and separation process.

A third alternate embodiment of the preferred invention consists of a remote skimmer, where the gravitational separator is located distantly to the skimmer. The separator air vent tube mounted through the vessel top must be sealed when using a remote skimmer. In this embodiment a floating hose connects the separator to the skimmer and the separator may be either floating nearby the skimmer, or mounted on a boat, dock, or on shore. The advantage of this second alternate embodiment is to better suit individual application scenarios.

The skimmer head with the downward protruding flow tube as used in all of the invention embodiments has the following advantages; a) to lower the center of gravity of the floating head for additional stability; b) to keep the flexible sleeve from collapsing on itself, which would increase the risk of floating head instability and pinching off the flow of oily water to the separator vessel; and c) to enhance the vertical floating head movement when buoyancy changes occur.

The skimmer head flow tube enhances the vertical floating head movement as the pump volume is changed, i.e. buoyancy changes occur as the pump flow volume increases the flow into the floating head is increased, causing the floating head to drawn lower into the oily water and lowers the level of water inside the tube, as compared to the outside level of the floating head. And so, as the head sinks further, more oily water enters the head resulting in a higher internal level and the head reaches equilibrium for that particular flow and oil/water concentration.

As will be understood, the operation of the oil pump within the preferred embodiment of the invention will affect the overall flow at the floating skimmer head during normal operating conditions.

Operation

During operation of the floating oil skimmer and gravitational separator system, by the action of the water pump inlet near the bottom of the vessel oil/water is drawn, through the skimmer head down the flow tube, through the descending tube and is deflected up from the deflector at the bottom of the descending tube. The deflector's vertical wall also contributes to the oil droplets coalescing. The oil droplets have a natural tendency to coalesce as they rise up through the water. The oil then collects under the vessel top cap outside of and adjacent to the debris catcher. Once enough oil collects under the vessel top cap, the oil can be pumped out to a collection tank that is remote from the separator vessel. The preferred embodiment further includes an oil pump, where the oil pump is activated by a floating switch just below the surface of the vessel top once a certain level of oil is collected. The oil pump has an outlet hole under the top cap of the separator vessel. The oil pump may be mounted inside of the vessel, or can be remotely positioned outside the vessel, such as on an oil tank mounted on a ship, barge, dock, or on land.

The skimmer head flow tube enhances the vertical floating skimmer head movement, as the pump volume is changed, i.e. buoyancy changes occur as the pump flow volume increases the oil/water flow over and through the floating skimmer head and down the flow tube, causing the floating head to be drawn lower into the oily water, lowering the level of water inside the tube, as compared to the water level outside of the floating skimmer head. And so, as the head sinks further, more oily water enters the skimmer head, resulting in a higher internal level and the skimmer head reaches equilibrium for that particular flow and oil/water concentration.

The system may include an automatic water pump control, which automatically compensates for a flow volume decrease as the oil pump operates to empty the collected oil. The automatic pump control automatically counteracts for the oil volume being pumped out and thereby compensates the vessel flow characteristics and assists to maintaining the floating skimmer head buoyancy for continuous operation.

A second alternate embodiment of the preferred invention includes a reversible water pump, where the same water pump that draws oil/water into the skimmer and thus the separator vessel, through the pick-up tube, can be reversed, once the collected oil reaches a certain level. This method will force the collected oil out through a hose or tube, towards an oil collection tank, which may be on a boat or ashore. This alternate embodiment eliminates the need for an oil pump, but requires that there be a one-way valve within the descending tube to block the descending tube as the water pump is reversed. Once the oil level is diminished to a specified level, the floating pump switch again reverses the water pump to restart the skimmer and oil collection and separation process.

Methods of Manufacturing

The floating oil skimmer and gravitational separator system is designed in a modular form, so that the modules are individually removable in the form of assembled units. The modules improve shipping, storage and assembly in the field The first module consists of the vessel containers, which have tapered sides and latches to attach the second module. The second module consists of a top cap for the container. The top cap includes float members and a skimmer head attached on top and between the float members. The top cap module also includes all the plumping from the skimmer head on top, to the water pump pickup below, including a coalescence/deflector and a mount for the water pump pickup. As well the top cap includes an oil collection area with an oil outlet.

The skimmer head itself is an assembled module within the top cap module. The skimmer head module consists of the skimmer head, with an attached flow tube and a flexible sleeve that surrounds the flow tube and connects the skimmer head onto a mounting plate.

When the skimmer head is used remotely to the separator vessel as in the third alternate embodiment mentioned above, the skimmer head assembly includes a mounting plate that mounts three floats. The flexible sleeve is then attached to the mounting plate, which includes a cylindrical housing below the mounting plate and a hose connected from a housing to the top cap plate of the separator vessel. This top cap plate replaces the skimmer head as was attached on the combined, no remote skimmer apparatus.

The vessel container tapered sides allow for stacking of the containers for easy transportation from the point of manufacture to storage sites or directly to the field.

BRIEF DESCRIPTION OF THE DRAWINGS

Advantages of the present invention will become more fully appreciated as the same becomes better understood when considered in conjunction with the following detailed description of an illustrative embodiment and accompanying drawings, in which like reference characters designate the same or similar parts throughout the several views, wherein;

FIG. 10 is a sectional elevational view of the invention as in FIG. 1, but showing the third alternate of the invention showing the vessel as configured for use with the remote skimmer as shown in FIGS. 7, 8 and 9, with the body of water level and oil collection level being shown with phantom lines, and the arrows show the oil/water flow characteristics.

FIG. 11 is a sectional elevational view of the preferred embodiment of the invention as in FIG. 1, showing the top cap module.

FIG. 12 is a sectional elevational view of the preferred embodiment of the invention as in FIG. 1, showing the vessel container module.

FIG. 13 is a sectional elevational view of the preferred embodiment of the invention as in FIG. 1, showing the skimmer head sub-module.

DETAILED DESCRIPTION OF THE PREFERRED EMBODIMENTS

Figure 1:
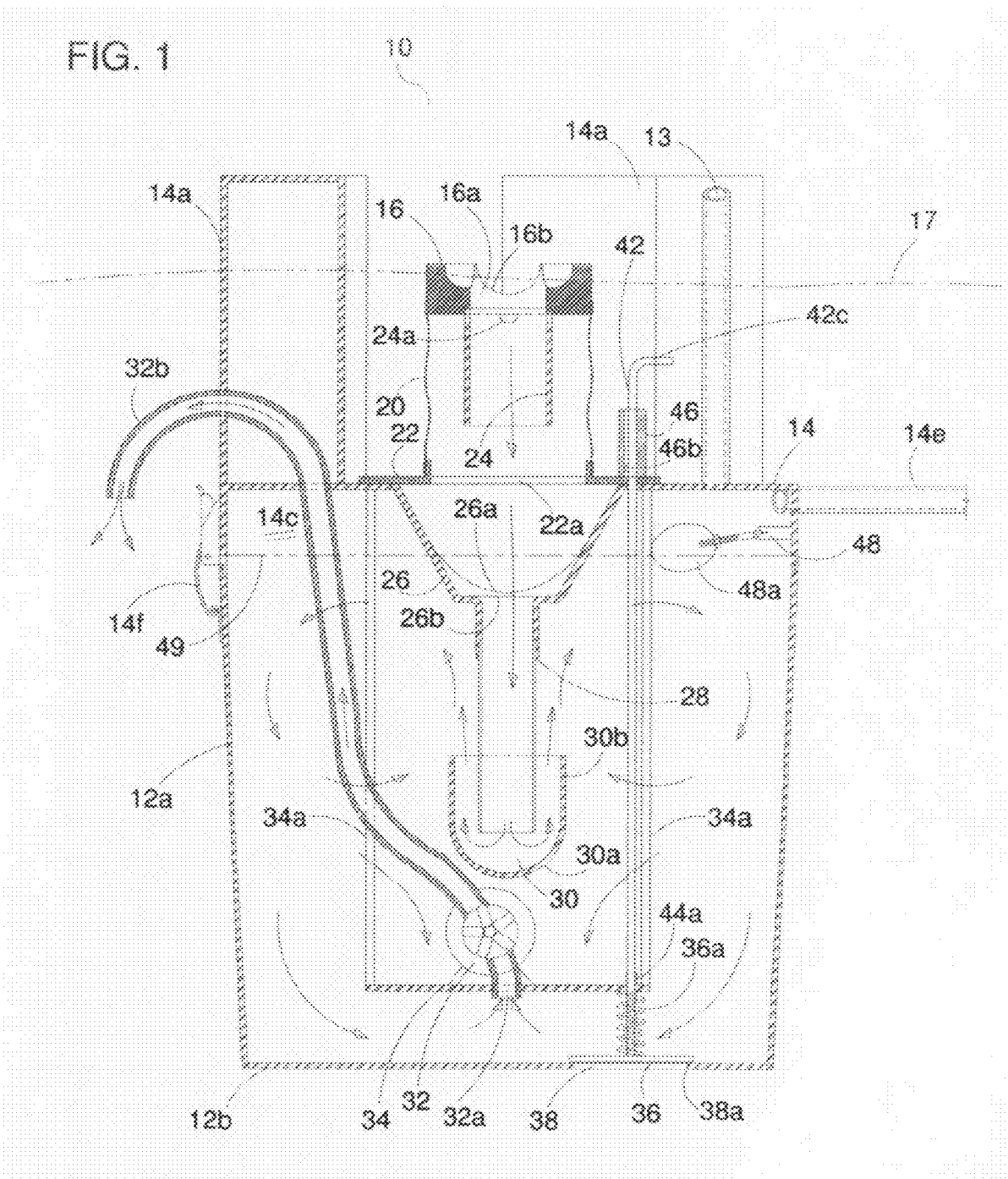
FIG. 1 is a sectional elevational view showing the preferred embodiment of the invention as taken downward along line A from FIG. 3, with the body of water level and oil collection level being shown with phantom lines, and the arrows show the oil/water flow characteristics.

The floating oil skimmer and gravitational separator system of the present invention is generally referred to as 10 as shown in a sectional view in FIG. 1. The floating oil skimmer and gravitational separator system 10 includes a container 12 where container 12 is of a cylindrical shape, where cylindrical container 12 has walls 12a, where walls or wall 12a are preferably tapered. Container 12 has a bottom 12b, where bottom 12b is permanently attached to container walls 12a. A removable top cap 14 is attached to the top of container walls 12a. On the top of top cap 14 are three floats 14a, where floats 14a assist in keeping container 12 floating at the desired level.

Centered in between top cap 14 is a round skimmer head float 16, skimmer head float 16 includes a skimmer hole 16a in the center of skimmer head float 16. Skimmer head float 16 may include oily water flow channels 16b cut over the top of skimmer head float 16. The flow channels 16b may be eliminated, where oily water 17 would flow over the top of skimmer head float 16. On the outside circumference, at the bottom of skimmer head float 16 a flexible sleeve 20 is attached. The bottom of flexible sleeve 20 attaches to a round plate 22, plate 22 has a central hole 22a, where plate 22 removably attaches to top cap hole 14b. At the inside bottom of skimmer hole 16a a downward protruding flow tube 24 is attach.

Flow tube 24 includes holes 24a just below the lower surface of skimmer head float 16, where holes 24a prevent any air or oil building up below the skimmer head float 16 between the top of flexible sleeve 20 and the top of flow tube 24.

Included and attached centrally below plate 22 is a debris catcher 26. Debris catcher 26 includes a screen 26a on debris catcher 26 bottom central passage 26b. Attached onto the bottom of debris catcher 26 is a descending tube 28, where the descending tube is held within the central circumference of the debris catcher 26.

Attached to the lower end of the descending tube 28, at about a central depth within the vessel is a cup shaped deflector/coalescer 30. Deflector/coalescer 30 has an optimized surface shape, where its lower hemispherical surface 30a, with a vertical surface 30b arising directly from the hemispherical lower surface.

Near the bottom of container 12, is a water pump 32, where water pump 32 is mounted on a plate 34. Water pump 32 has an inlet 32a and an outlet tube 32b, where water pump 32 pumps water through outlet tube 32b. Mounting plate 34 is suspended by rods 34a directed downwards from the bottom of top cap 14.

The mounting plate 34 also mounts a filling and emptying valve 36, where the filling and emptying valve 36 contacts rim 38a of filling and emptying hole 38 in bottom 12a of container 12. Filling and emptying valve 36 is connected to a valve control stem 42, where valve control stem 42 projects up through container cap 14. Valve 36 includes a valve spring 36a, a lower valve guide 44a and an upper valve guide 46, where upper valve guide 46 has a slot 46a, where slot accepts an valve open stop 42b attached to valve control stem 42. Valve 36 open stop 42b is raised up above valve guide 46, valve control stem 42 is then turned 90 degrees by valve control stem handle 42c so that valve open stop 42b rests on top of upper valve guide 46.

Top cap 14 includes oil level switch 48 which is attached to oil level float 48a, where once oil is collected to oil level line 49, in oil collection area 14c, oil pump (not shown) removes oil from oil collection area 14c. Top cap 14 may also include an air vent 13.

Figure 2:
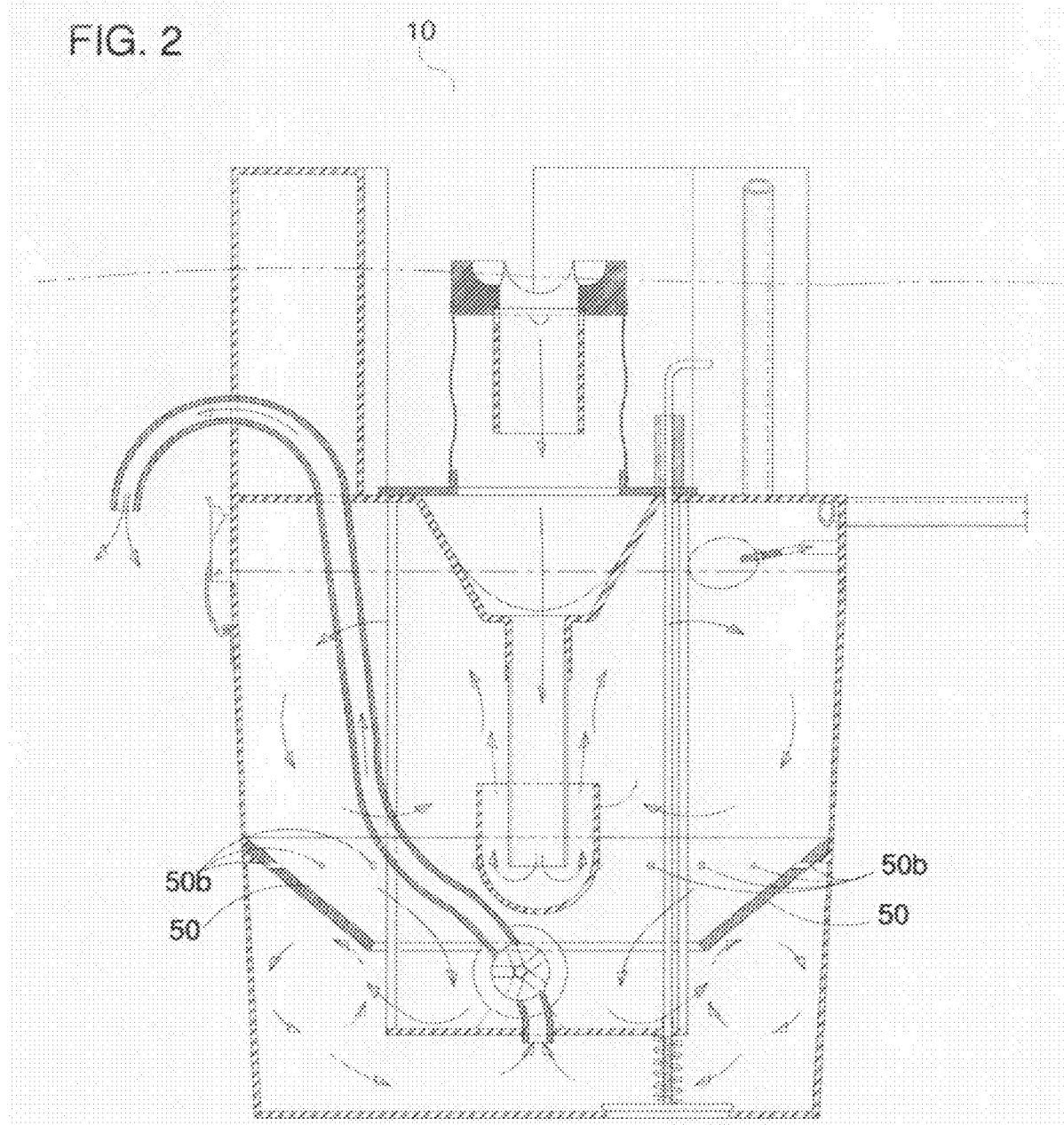
FIG. 2 is a sectional elevational view of the invention as in FIG. 1, showing an alternate coalescence/deflector mounted approximately at the mid section of the vessel wall, with the body of water level and oil collection level being shown with phantom lines, and the arrows show the oil/water flow characteristics.
Figure 3:
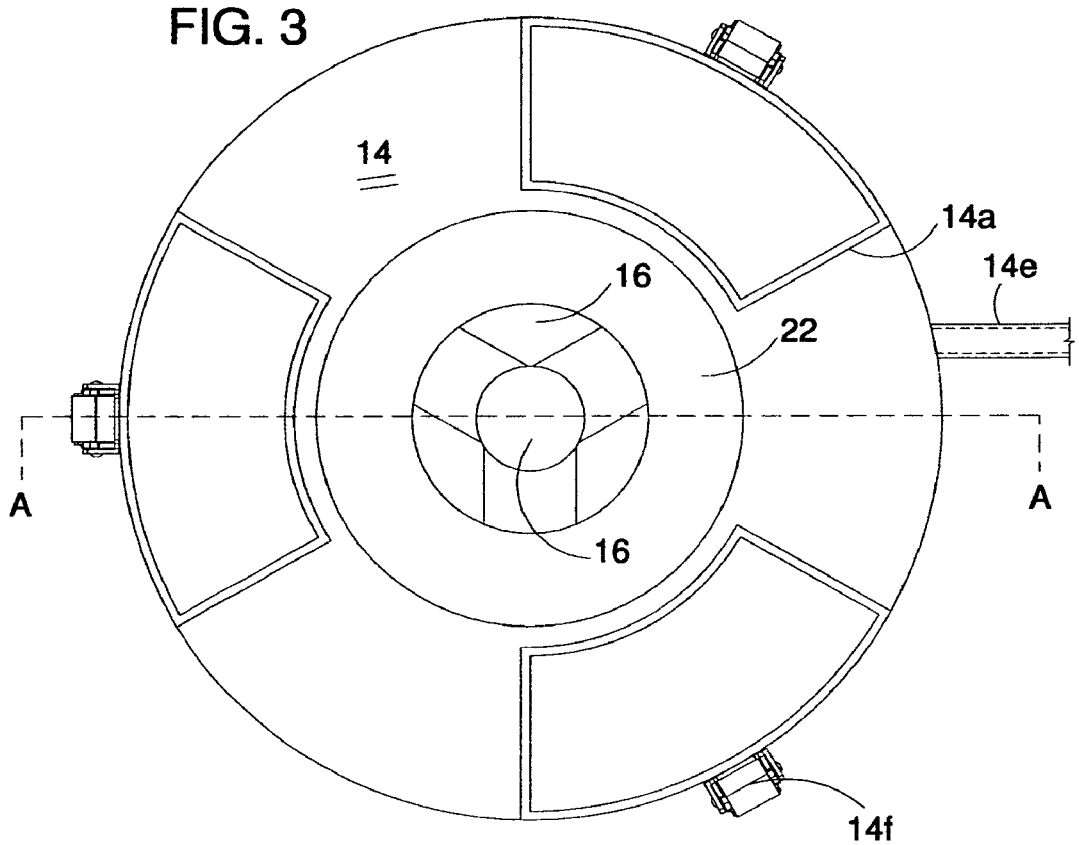
FIG. 3 is a top plan view of the invention, of the preferred embodiment of the invention.
Figure 4:
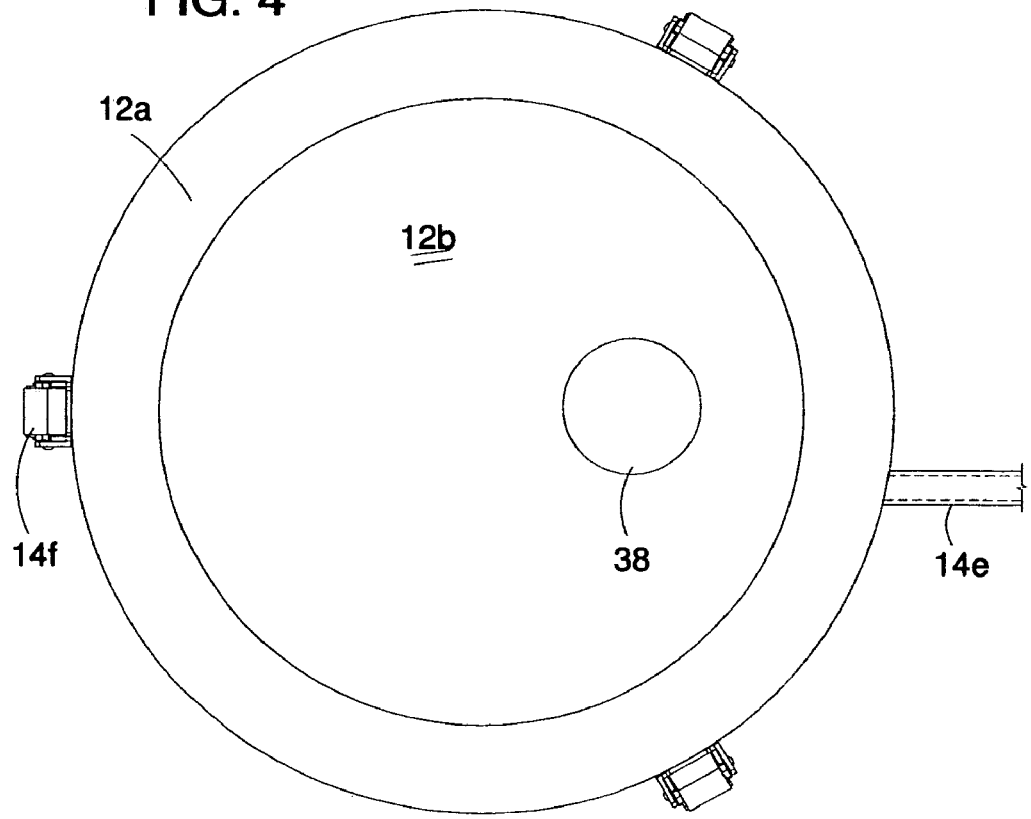
FIG. 4 is a bottom plan view of the invention, of the preferred embodiment of the invention.

A first alternate embodiment of the preferred invention as seen in FIG. 2 the separator vessel includes a circular, downward sloping coalescence/deflector 50 mounted near the lower mid section of the container 12. Coalescence/deflector 50 includes a single central hole 50a, and a row of small holes 50b around the periphery.

Figure 5:
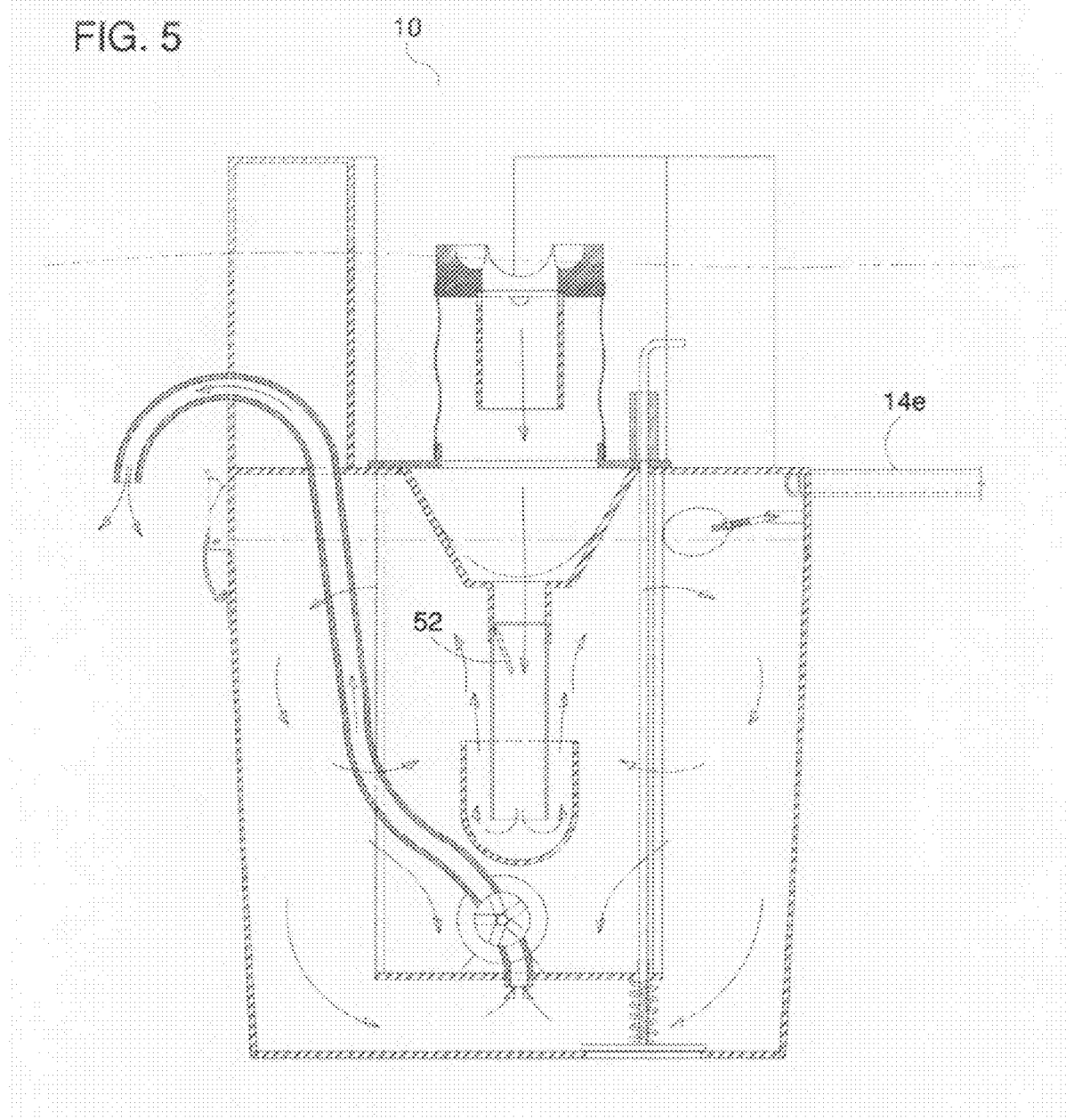
FIG. 5 is a sectional elevational view of the invention as in FIG. 1, but showing an alternate embodiment one-way valve in the descending tube in the open position during normal operation, with the body of water level and oil collection level being shown with phantom lines, and the arrows show the oil/water flow characteristics.
Figure 6:
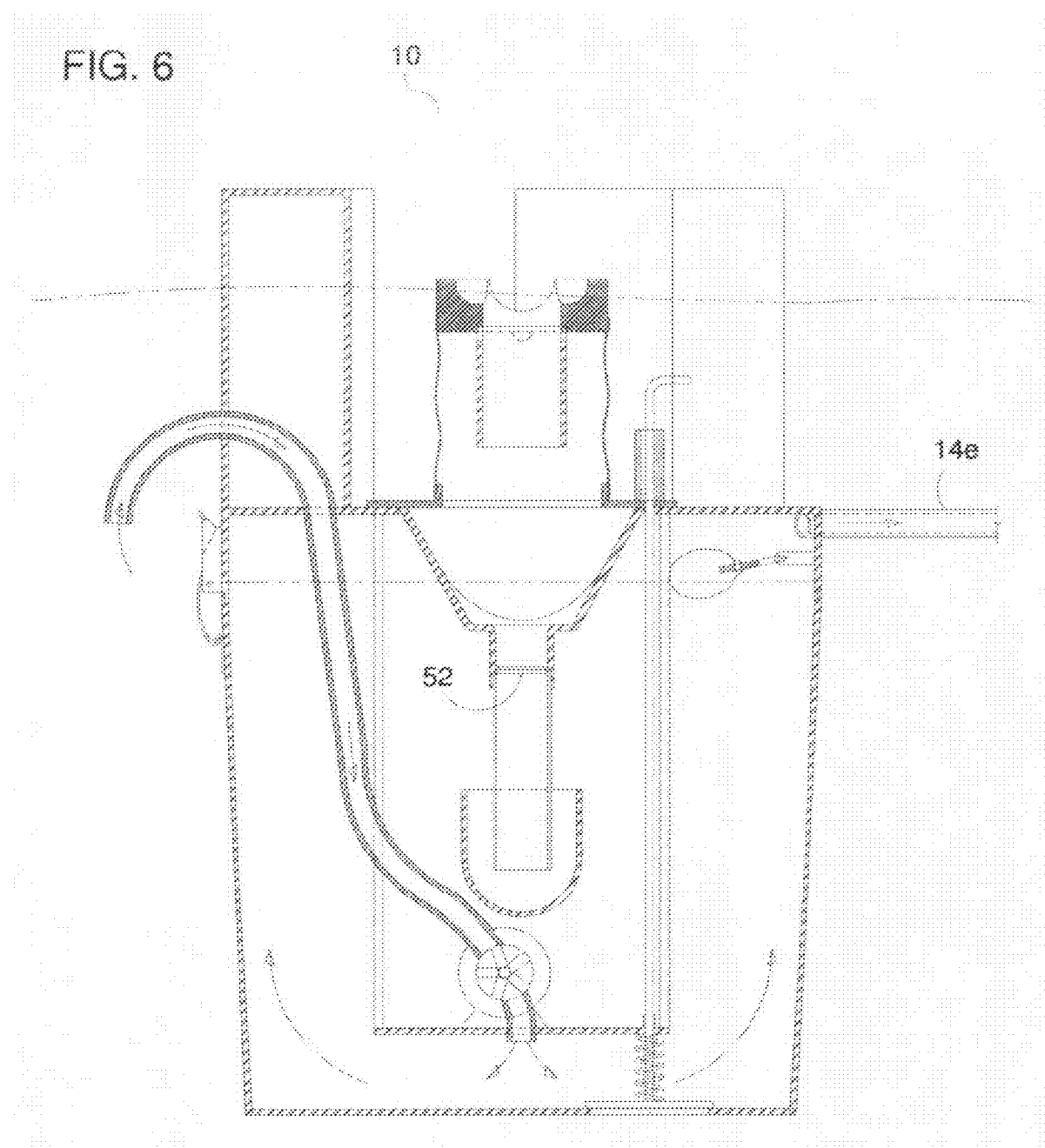
FIG. 6 is a sectional view of the invention as in FIG. 1, but showing an alternate one-way valve in the descending tube in the closed position during water pump reversal, pushing collected oil from the oil collection area, with the body of water level and oil collection level being shown with phantom lines, and the arrows show the oil/water flow characteristics.

A second alternate embodiment of the preferred invention as seen in FIGS. 5 and 6 includes one-way valve 52 within descending tube 28 for operation of a reversible water pump if installed.

Figure 7:
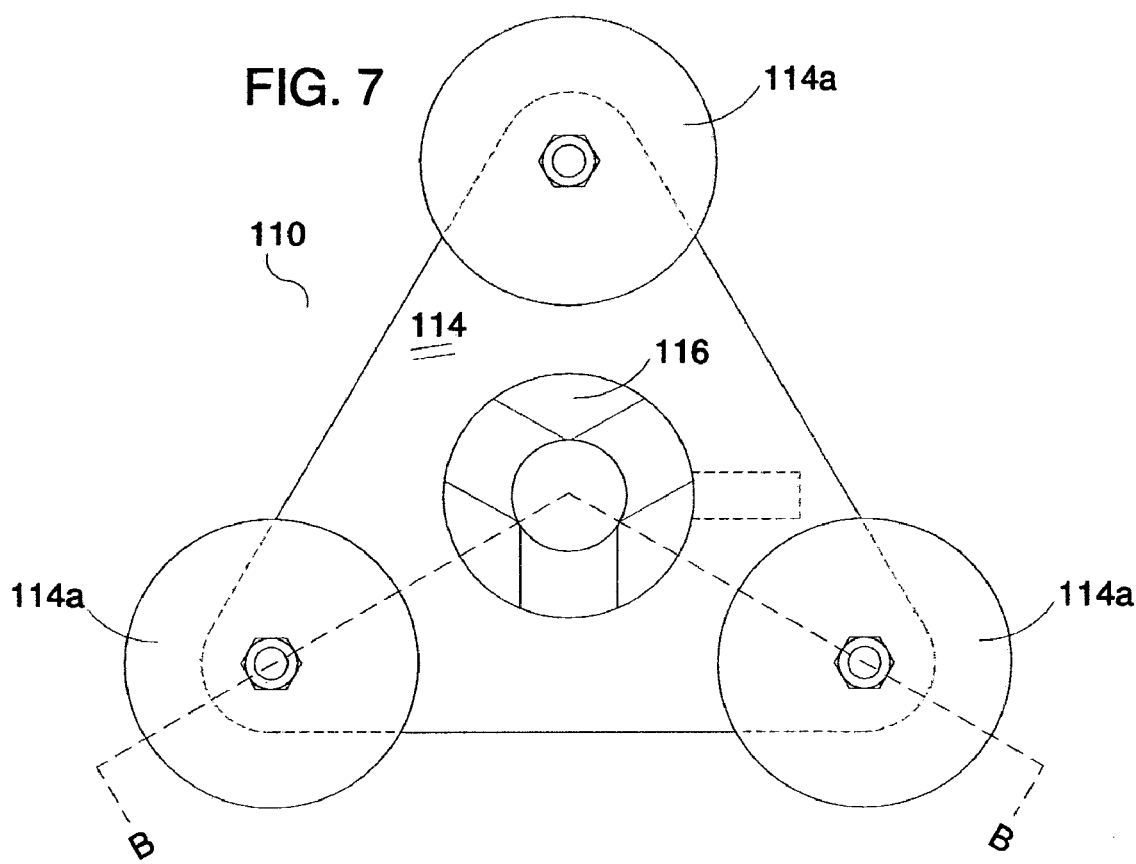
FIG. 7 is a top plan view of the invention, showing the third alternate embodiment of the invention.
Figure 8:
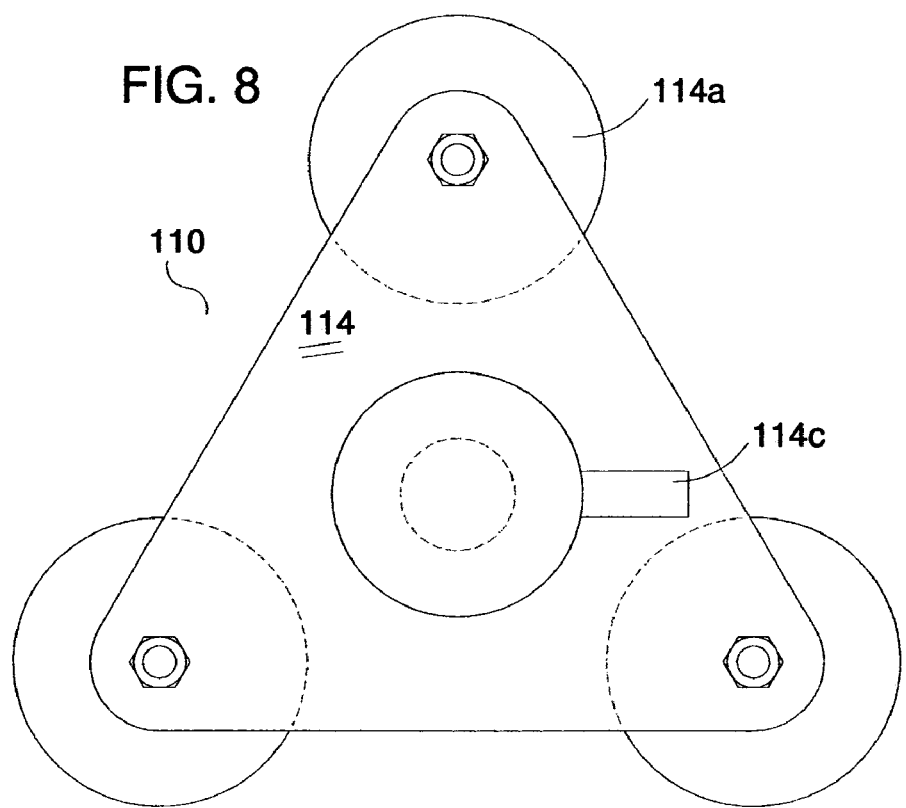
FIG. 8 is a bottom plan view of the invention, showing the third alternate embodiment of the invention.
Figure 9:
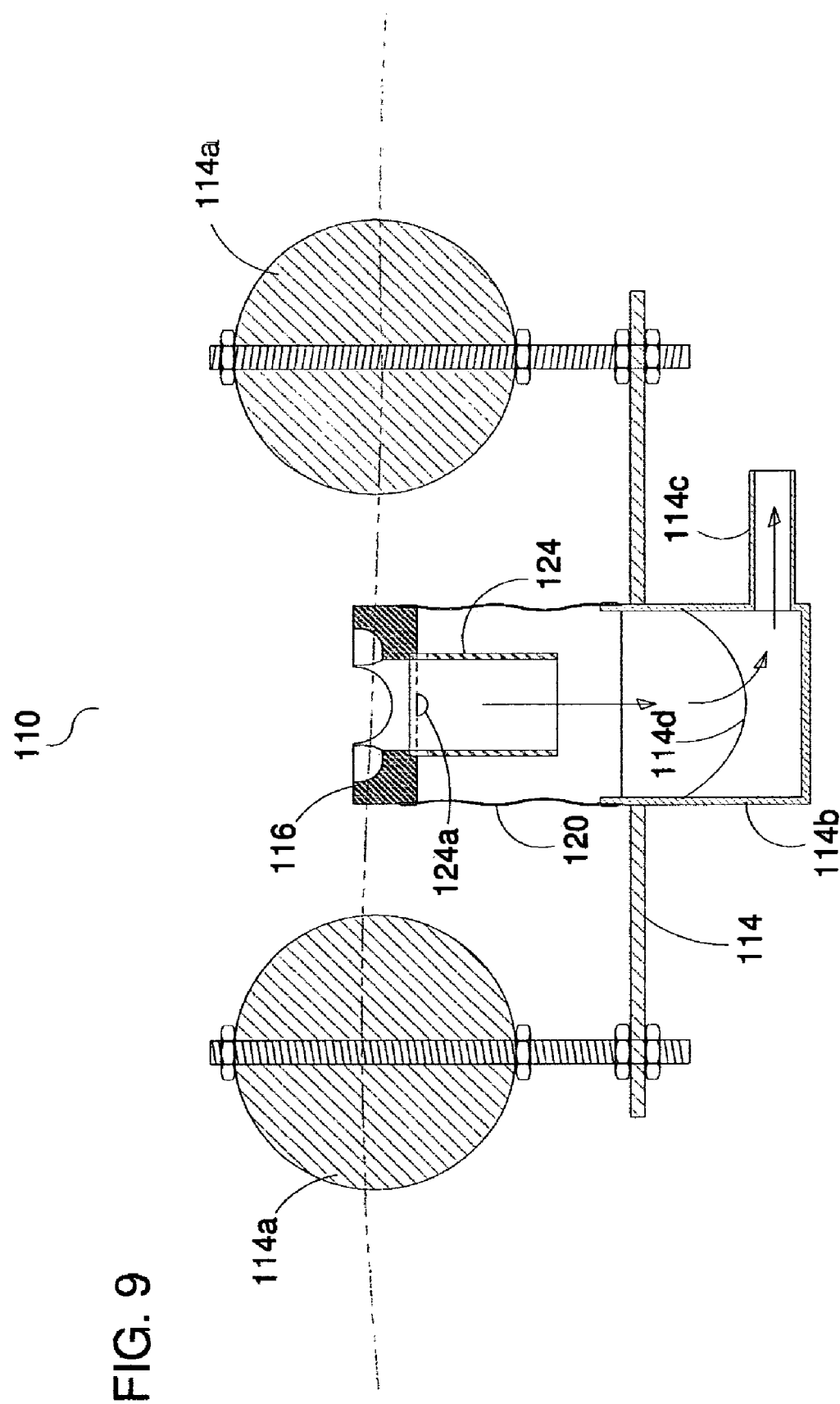
FIG. 9 is a sectional elevational view of the third alternate embodiment of the invention as taken downward along line B from FIG. 7, and showing the body of water level with a phantom line, with the body of water level and oil collection level being shown with phantom lines, and the arrows show the oil/water flow characteristics.

A third alternate embodiment of the preferred invention, remote skimmer head assembly 110 is best seen in FIGS. 7, 8 and 9, skimmer head assembly 110 is used remotely to separator vessel 112 as best seen in FIG. 10. Remote skimmer head assembly 110 includes skimmer head float 116, which is above mounting plate 114. Plate 114 includes a cylindrical housing 114b which attaches skimmer head float 116 by flexible sleeve 120. Mounting plate 114 includes three adjustable floats 114a. Cylindrical housing 114b has an attached hose 114c, which is connected to top cap plate 122 on separator vessel 112. Cylindrical housing 114b may also include an debris screen 114d.

Skimmer head float assembly 110 includes downward protruding flow tube 124 attach to the bottom of skimmer head 160, within flexible sleeve 120. Flow tube 124 includes holes 124a just below the lower surface of skimmer head float 116.

As seen in FIGS. 11, 12 and 13 the unit modules are shown. As seen in FIG. 11 top cap module 10a consists of a top cap 14, latches 14d for attachment of container module 10b, float members 14a and a skimmer head 16. Skimmer head 16 is attached on top of top cap 14 by flexible sleeve 20. The top cap module 10a also includes all the plumbing from the skimmer head 16 to the water pump pickup 32a below, including flow tube 24, descending tube 28, coalescence/deflector 30a and 30b, and a mount 34 for the water pump 32 and water pump pickup 32a. As well the top cap module 10b includes an oil collection area 14c with an oil outlet 14e.

As seen in FIG. 12 the vessel container unit module 10b as sheen in FIG. 12 consists of the vessel container tapered sides 12a, a bottom cap 12b, filling and emptying hole 38a and latch catches 12c. Latch catches 12c accept latches 14f of top cap module 10a.

As seen in FIG. 13 there is a skimmer head module 10c, which is a sub-module assembly that fits within the top cap module 10a. The skimmer head module 10c consists of the skimmer head 16, with attached flow tube 24 and flexible sleeve 20 that connects skimmer head 16 onto mounting plate 22.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

It is intended that the scope of the invention be defined by the Claims appended hereto and their equivalents.

What is claimed is:

1. A floating oil skimmer and gravitational separator system, comprising;
    a vessel having a substantially cylindrical wall, a top cap and a bottom cap;
    a plurality of flotation members attached to said top cap;
    a water pump within said vessel having an inlet near said bottom cap; an oil collection area having an outlet under said top cap;
    an opening in said top cap between said floating members;
    a floating skimmer having a head with a central orifice attached to said opening by a flexible sleeve;
    a downwardly protruding inlet tube attached to said skimmer head under said orifice; and
    said inlet tube having a plurality of openings at an upper end under said skimmer head.

2. A floating oil skimmer and gravitational separator system as defined in claim 1, wherein said skimmer head sleeve is in communication with a descending tube having a cylindrical shape having a top and a bottom, a deflector at the bottom of said descending tube; and where said descending tube and said deflector are offset by a spaced area equal to that of the inside diameter area of said descending tube.

3. A floating oil skimmer and gravitational separator system as defined in claim 2, wherein said deflector has a hemispherical bottom and substantially vertical cylindrical sides, said hemispherical bottom being offset from said descending tube a spaced area equal to the area of the inside diameter of said descending tube and where said vertical side causes coalescence of oil droplets.

4. A floating oil skimmer and gravitational separator system as defined in claim 2, wherein said vessel has a second coalescence/deflector attached inside said vessel wall therebetween said top cap and said bottom cap of said vessel having one major central opening and a plurality of minor openings arrayed near said vessel wall.

5. A floating oil skimmer and gravitational separator system as defined in claim 4, wherein said second coalescence/deflector is downward sloping towards said central opening.

6. A floating oil skimmer and gravitational separator system as defined in claim 1, wherein said vessel has a valve opening through said vessel bottom cap, where said valve is mechanically controlled from above said vessel top cap.

7. A floating oil skimmer and gravitational separator system as defined in claim 1, wherein said vessel top cap oil outlet has an oil collection level switch having a specific gravitational mass greater than oil but less than water.

8. A floating oil skimmer and gravitational separator system as defined in claim 1, wherein said water pump is controlled automatically.

9. A floating oil skimmer and gravitational separator system, comprising:
    a vessel having a substantially tapered cylindrical wall with a fixed bottom cap and a removable top cap;
    a plurality of flotation members attached to said top cap;
    said vessel having a water pump inlet near said fixed bottom cap;
    an oil collection area having an outlet under said top cap;
    an opening centered therebetween said floating members;
    a floating skimmer head having a centered orifice attached by a flexible sleeve to a top cap plate covering said opening;
    a downwardly protruding inlet tube attached to said skimmer head under said orifice; said inlet tube having a plurality of openings at an upper end under said skimmer head;
    a descending tube under said opening, said descending tube including a coalescence/deflector, said coalescence/deflector having a hemispherical bottom and substantially vertical cylindrical sides;
    said hemispherical bottom being offset from said descending tube a spaced area equal to the area of the inside diameter of said descending tube; and
    said top cap, said skimmer head, said inlet tube, said sleeve, said top cap plate, said descending tube and said coalescence/deflector are an assembly and said assembly is removably attached to said vessel top opening, as a single unit.

10. A floating oil skimmer and gravitational separator system as defined in claim 9, wherein said water pump inlet and water pump outlet are part of said assembly.

11. A floating oil skimmer and gravitational separator system, comprising;
    a vessel having a substantially tapered cylindrical wall with a bottom cap and a top cap;
    a water pump within said vessel having an inlet near said bottom cap;
    an oil collection area having an outlet under said top cap, an opening in said top cap, where said opening removably attaches to a first end of a oil/water inlet hose;
    second end of said oil/water inlet hose is attached to a remote skimmer head;
    said remote skimmer head including a mounting plate and a housing;
    said remote skimmer head mounting plate including a polar array of floats;
    said remote skimmer head mounting plate having a centrally located opening in communication with said housing;
    said remote skimmer head being attached to said opening by a flexible sleeve;
    a downwardly protruding inlet tube attached under said remote skimmer head said mounting plate opening; and
    said inlet tube having a plurality of openings at an upper end under said remote skimmer head.

* * * * *